UNITED STATES PATENT OFFICE 2,504,875

METHOD FOR PRODUCING 4-HYDROXY-QUINOLINES

Charles C. Price, Royston M. Roberts, and Harry F. Herbrandson, Urbana, Ill., assignors to the United States of America as represented by the Secretary of War No Drawing. Application June 4, 1945, Serial No. 597,584

2 Claims. (Cl. 260—289)

The present invention relates to the preparation of certain quinoline compounds, and more particularly, to a new and improved method of synthesizing certain nuclear substituted quinoline compounds having at least one nuclear substituent in each ring of the quinoline nucleus.

Di- and poly-substituted quinoline compounds having at least one substituent in each ring of the quinoline nucleus constitute an important class of intermediates used in the preparation of various industrial and pharmaceutical products. Of this group of intermediates, the 4-hydroxy-quinoline compounds of the type (I) having at least one monovalent nuclear substituent (X) in the carbocyclic ring of the quinoline nucleus

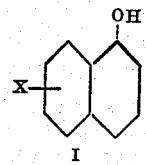

I are of particular interest because of the antimalarial effectiveness of certain derivatives obtainable therefrom (compare Andersag et al. U. S. Patent No. 2,233,970).

Intermediates of this general type (I) have heretofore been prepared by condensing a nuclear substituted aniline, for example m-chloraniline (II), with oxaloacetic ester (III), to form the corresponding anil (IV) and then cyclizing the anil to produce a nuclear substituted 4-hydroxy-quinoline-2-carboxylic acid ester (V). The resulting ester may be converted to the corresponding free acid (VI) and the acid decarboxylated to produce a substituted quinoline compound (VII) of the general type (I).

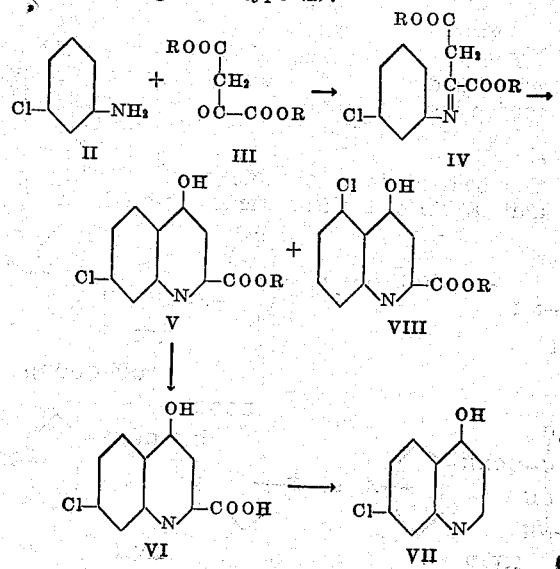

Although the foregoing preparative method is probably more satisfactory than any other process heretofore available for the synthesis of compounds of this general type (I), the process in question is nevertheless subject to several serious limitations. Of these, perhaps the most significant arises from the fact that when the process is carried out with a meta substituted aniline compound having two free ortho hydrogen atoms, for instance, with m-chloraniline (II), the product of cyclization is generally a mixture containing substantial proportions of each of the two possible isomers (V and VIII). As a result, the yield of the desired isomer (e. g., V) is undesirably low, and although separation of the isomers is possible, it is nevertheless a laborious and wasteful operation that still further reduces the ultimate yield of the desired compound.

Another disadvantage of this synthetic method arises from the fact that, as a general rule, the 2 - carboxy - 4 - hydroxyquinoline compounds formed as intermediates in this process (e. g., VI) are often difficult to decarboxylate, and in such instances, the yields in the decarboxylation step are also undesirably low. For these and other reasons, the synthetic methods heretofore available for the preparation of compounds of type (I) leave much to be desired.

Broadly speaking, the object of the present invention is to provide a novel synthetic method that obviates the disadvantages of the prior art processes of producing 4-hydroxyquinoline compounds having at least one monovalent nuclear substituent in the carbocyclic ring of the quinoline nucleus.

A more particular object is the provision of an improved method of producing substituted quinoline compounds suitable for use as intermediates in the synthesis of anti-malarials.

Another object is to produce intermediates of the class described, by a process involving a cylization reaction that generally forms a reaction product consisting preponderately of one isomeric compound in those instances where ring closure can theoretically take place in two different ways with the formation of two isomeric compounds.

Still another object is to produce the above type of intermediate by a process involving the formation of a nuclear substituted 4-hydroxy-quinoline carboxylic acid that is readily decarboxylated in high yields to the desired intermediate (I).

A further object is the provision of a new and improved method of producing 4-hydroxy- and 4-haloquinoline compounds having a substituent in the 7 position of the quinoline nucleus, by a process that utilizes readily available raw materials, generally avoids the formation of substantial proportions of isomeric by-products and involves a sequence of steps all of which give high yields of the desired product in a relatively high state of purity as formed.

Other objects and advantages will be apparent as the invention is hereinafter more particularly described.

The foregoing objects may be accomplished in accordance with the process of the present invention, which is based in part upon the fact that, under appropriate conditions, acrylic acid esters of the type (IX), having (a) in the alpha position, a carbalkoxy group (—COOR), a substituted carbamyl group (—CONHR'), or a cyano group (—CN), and
(b) in the beta position, a nuclear substituted phenylamino group

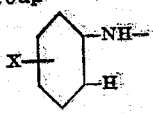

having at least one ortho hydrogen atom, will react, either in their acrylic ester form (IX), or in their isomeric anil form (X), to produce a nuclear substituted 4-hydroxyquinoline-3-carboxylic acid derivative of the type (XI).

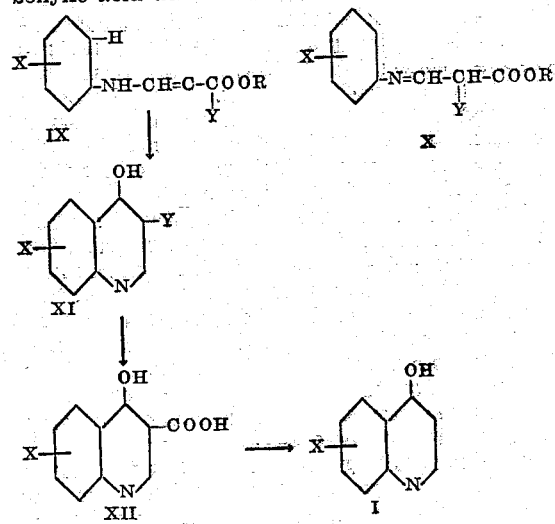

R=Alkyl (including aralkyl).
X=one or more non-reactive monovalent nuclear substituents or radicals.
Y=—CN, —COOR or —CONHR'.
R'=alkyl or aryl (including nuclear substituted aryl).

Where the substituted phenylamino radical is such that ring closure can theoretically take place in two different ways with the formation of two isomeric products (as, for example, in the case of m-chloranilinomethylenemalonic ester), the cyclization product, as a general rule, consists predominantly of the corresponding 7-substituted-4-hydroxyquinoline compound, the isomeric 5-substituted-4-hydroxyquinoline compound being present, if at all, usually in a very minor proportion. The process therefore offers the distinct advantage of producing high yields of a 7-substituted-4-hydroxyquinoline compound that is generally relatively free of contamination with isomeric by-products.

A further advantage of the present invention arises from the fact that the free quinoline-3-carboxylic acids (XII) derivable from the products of cyclization (i. e., the free acids corresponding to the ester, nitrile or anilide), are readily decarboxylated to the desired intermediate (I). Indeed, as a general rule, the 3-carboxy-4-hydroxyquinoline compounds as a class decarboxylate with surprising ease; in contrast to the difficulty usually encountered in decarboxylating quinoline-3-carboxylic acids that have no hydroxyl group in the 4 position.

The substituted acrylic acid esters (IX) or their isomeric anils (X) constituting the starting materials for the process of the present invention may be prepared by various methods, depending in part on the character of the radical in the alpha position of the ester residue. Thus where the alpha group is a carbalkoxy radical (i. e., where Y=—COOR), the starting materials are readily obtainable by condensation of the appropriate nuclear substituted aniline (XIII) with an alkoxymethylenemalonic ester (XIV), according to the method described by Claisen in Ann. 297, 77 (1897).

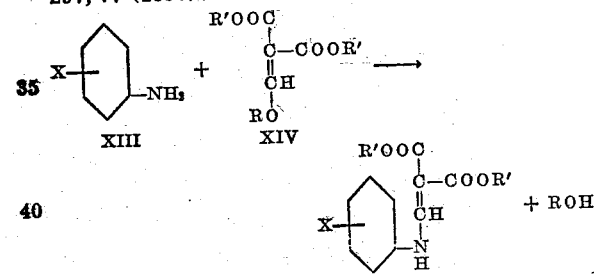

The corresponding type of compounds where Y is a cyano radical may be formed in a similar manner from a nuclear substituted aniline (XIII) and an alkoxymethylenecyanacetic ester (XV), according to the scheme:

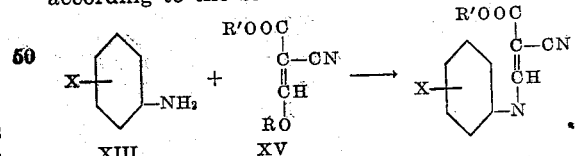

The starting materials of the type where Y is a substituted carbamyl radical may be prepared by condensing the appropriate nuclear substituted aniline (XIII) with orthoformic ester to form the corresponding formamidine (XVI) which may then be treated with malonic ester to produce the anil (XVII) or the isomeric acrylate (XVIII)

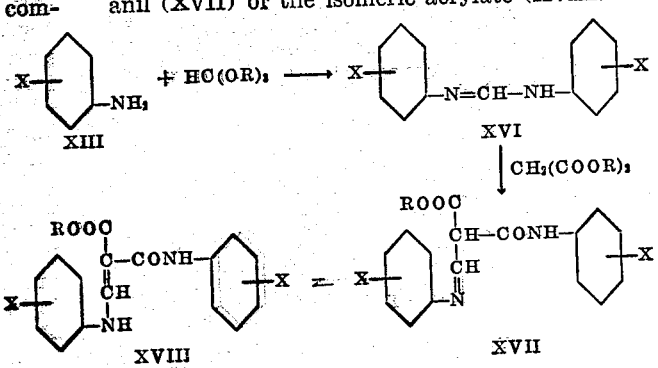

In carrying out the cyclization step of the present invention, the selected α-,β- disubstituted acrylic acid ester or its isomeric anil of the type described above (IX or X) is heated to a temperature sufficient to effect the elimination of a molecule of alcohol. Where the starting material is obtained from an alkoxymethylene malonic ester (i. e., where Y equals carbalkoxy in formula IX), the starting material may be cyclized merely by heating the substantially pure material to a temperature of the order of about 250° C. Cyclization may also be accomplished by similarly heating a solution of the uncyclized ester in a high boiling inert solvent (e. g., diphenyl ether, mineral oil or the like), preferably using roughly one mole of ester per liter of solvent.

In those cases where the starting material consists of the alpha-cyano- or alpha-carbanilino-acrylates or their isomeric anils, (i. e., where Y is cyano or carbanilino in formula XI or X), satisfactory yields are obtained by dissolving these materials in a relatively large proportion of high boiling inert solvent (e. g., 0.05 to 0.25 mole of uncyclized product per liter of solvent) and heating the resulting dilute solution to a temperature of the order of about 250° C. In the absence of a solvent or heat exchange medium, starting materials of these latter types tend to form tarry reaction products when heated, whereas in more or less dilute solution in an appropriate amount of neutral solvent, the compounds produce excellent yields of the desired cyclized product in a relatively high state of purity.

The cyclized product is readily converted in high yields to the corresponding free acid (XII). In the case of the quinoline-3-carboxylic esters (Y=—COOR) hydrolysis may be accomplished, for example, by saponification with aqueous alkali followed by acidification of the reaction mixture. In the cases of the quinoline-3-carboxylic acid nitriles and anilides (Y=—CN or —CONHR'), hydrolysis may be effected by refluxing the cyclized products with strong (e. g., 75%) aqueous sulfuric acid.

The decarboxylation step of the present invention is readily acomplished simply by fusing the free carboxylic acid (XII) for a short period until effervescence ceases. The yields in this step are also generally high (75–95%) and in many cases are nearly quantitative (96–98%). As an alternative method of decarboxylation, the free acid (XII)—which need not be thoroughly dry—may be suspended in the same solvent that was used in the cyclizing step (e. g., in diphenyl ether) and the suspension heated until the solid dissolves or until evolution of carbon dioxide ceases. The decarboxylated product generally crystallizes from the solvent when the reaction mixture cools. The yields obtained in this alternate method are also generally high.

In order more clearly to disclose the nature of the present invention, several specific examples will hereinafter be described in considerable detail. It should be clearly understood, however, that this is done solely by way of example and not for the purpose of delineating the scope of the invention or of restricting the ambit of the appended claims.

EXAMPLE I

PREPARATION OF 4,7-DICHLOROQUINOLINE (a) *Preparation of diethyl ethoxymethylene-malonate*

Ethoxymethylenemalonic ester was prepared from ethyl orthoformate and malonic ester by a slight modification of the original procedure of Claisen (Ann., 297, 75 (1897)), the principal change being the use of a much smaller amount (i. e., a trace) of zinc chloride. Yields on several runs ranged between forty-five and fifty-five per cent of the theoretical.

(b) *Preparation of the anil*

Equimolecular amounts of m-chloraniline and diethyl ethoxymethylenemalonate were mixed and (a) warmed at 120° C. with stirring for one hour, or (b) allowed to stand in vacuo for sixteen hours while a stream of air was conducted through the mixture by means of a capillary tube. With the first method, there was obtained an oil which solidified on standing but which may be used directly in step c. When the second method was used, the product was obtained as a white crystalline mass. The yields by both methods were practically quantitative.

(c) *Cyclization*

The molten anil was slowly added to three to four times its weight of diphenyl ether or "Dowtherm A" (a mixture of diphenyl ether and diphenyl) maintained at about 245–250° C. After all the anil had been added the mixture was held at about 245–250° C. for about one hour. An air-cooled condenser was used so that the alcohol produced during cyclization might escape easily. In some cases a rapid stream of nitrogen was led into the mixture by a tube which reached to the bottom of the flask. In other cases, particularly in small (0.1 mole) runs, no nitrogen was used and the solution was merely refluxed at the boiling point. Some of the cyclized product separated during the heating period, and after cooling, the reaction mixture became practically solid. The cold mixture may be used directly in the next step. Samples isolated from this reaction mixture by filtration and washing with petroleum ether were pure 3-carbethoxy-4-hydroxy-7-chloroquinoline; M. P., 296–298° C. (uncorr.). Yields of up to 96 per cent of the theoretical were obtained in the cyclization step.

(d) *Hydrolysis*

To the cyclization mixture was added 2.5 equivalents of 10 per cent aqueous sodium hydroxide and saponification was allowed to proceed under reflux for from one to three hours, depending on the size of the run. (Saponification is complete within thirty minutes for 0.1 mole runs.) The resulting two-phase mixture was separated by siphonation or by means of a separatory funnel and the aqueous layer was washed with ligroin or petroleum ether and filtered. The acid was precipitated with 18 per cent aqueous hydrochloric acid, collected on a filter and thoroughly washed by resuspension in water and refiltration. The acid was then dried in a vacuum oven. Overall yields for the conversion of the ester to the free acid were 90–95 per cent of the theoretical.

(e) *Decarboxylation*

The thoroughly dried acid was heated in 200 to 300 grams portions to 250–270° C.; carbon dioxide was evolved readily as the material melted. The mixture was heated until effervescense ceased (five to ten minutes after completely melted) and then allowed to cool and solidify. The cake was ground up and used directly in the next step. The yield was 98% of the theoretical.

As an alternate method of decarboxylation, the acid (which need not be completely dry) may be suspended in about five times its weight of diphenyl ether or "Dowtherm A" and heated under reflux for an hour. When the solution was allowed to cool to room temperature, the hydroxyquinoline crystallized.

(f) Conversion to 4,7-dichloroquinoline

To 4.4 moles of phosphorus oxychloride, heated to 90–100° C. was added 1.7 moles of the decarboxylated product in small portions. The mixture was stirred during the addition and allowed to boil under reflux. After the addition was complete, the excess phosphorus oxychloride was recovered by distillation in vacuo and the residue was added to 1 to 2 liters of ice and water. The resulting solution of the hydrochloride was filtered and the filtrate neutralized carefully with 10 per cent aqueous sodium hydroxide to liberate the free base. The light tan precipitate was collected on a filter, washed thoroughly and dried in air at 50° C. for thirty-six hours. Yields of 75–80 per cent of the theoretical were obtained.

The conversion may also be carried out on the product obtained in the second or alternate method of carrying out step e, without separating the product from the solvent. In this case phosphorus oxychloride may also be used. The cooled reaction mixture is poured into water and the 4,7-dichloroquinoline is extracted with dilute hydrochloric acid.

Purification of the final product was effected by recrystallization from either methanol or ethanol-water mixtures, or by extraction of the crude material with low boiling petroleum ether. The purified product, melting at 85–86° C., consisted of white needles.

EXAMPLE II

PREPARATION OF 4-CHLORO-7-TRIFLUOROMETHYLQUINOLINE

(a) Preparation of anil

A mixture of 16.1 g. (0.1 mole) of m-trifluoromethylaniline and 21.6 g. (0.1 mole) of ethoxymethylenemalonic ester was placed in a filter flask and suction was applied from a water pump (ca. 20 mm.). The contents of the filter flask was kept at 50° C. for one and one-half hours. The product was a light yellow oil which solidified after standing a day; it melted at 45–46° C. The yield was 33 g. or 90% of the theoretical.

(b) Cyclization

In a 250-cc. flask was placed 100 cc. of diphenyl ether. The solvent was heated to boiling over an open flame and 16.5 g. (0.05 mole) of the anil was added dropwise from a dropping funnel, over a period of twenty minutes. When the last of the anil had been added, the product began to precipitate. The refluxing was continued for another twenty minutes and then stopped. The filtering and washing operations were similar to those used in the preparation of dichloroquinoline. The yield was 12 g. or 85% of the theoretical; M. P., ca. 294–297° C.

(c) Hydrolysis and decarboxylation

A mixture of 56.5 g. of the ester and 10% aqueous sodium hydroxide was refluxed for two and one-half hours and the reaction mixture was then acidified. The yield was 48 g. of the acid or 92% of the theoretical. The acid decomposed at 250° C.

In a 1000-cc. flask, 49.5 g. of the free acid was heated at 265–270° C. for five minutes; 39 g. of 4-hydroxy-7-trifluoromethyl quinoline (92% of the theoretical) was obtained; M. P., 268–270° C.

(d) Conversion to 4-chloro-7-trifluoromethyl quinoline 40.2 g. (0.019 mole) of phosphorus pentachloride and 4.611 g. (0.003 mole) of phosphorus oxychloride in a three-necked flask equipped with a stirrer was heated to 90° C. To this was added 3.9 g. (0.018 mole) of the above hydroxy compound. The temperature was then raised to 130° C. and heating was continued at this temperature for forty minutes. The product was worked up in the manner described in Example I. The yield of 4-chloro-7-trifluoromethylquinoline was 3.8 g. or 90% of the theoretical; M. P. 71–72° C.

EXAMPLE III

PREPARATION OF 4-CHLORO-7-FLUOROQUINOLINE

(a) Preparation of the anil

In a 125-cc. flask was placed 19.2 g. (.173 mole) of m-fluoroaniline and 40.4 g. (.187 mole) of ethoxymethylenemalonic ester. The solution was then immersed in an oil bath at 100° C. for forty minutes and the solution was stirred mechanically. Practically all of the ethyl alcohol was evolved during the first ten minutes. The resulting hot reaction mixture was used directly in the subsequent step.

(b) Cyclization

In a 500-cc. flask equipped with an air condenser was placed 175 cc. of diphenyl ether. The solvent was heated to reflux and then the anil (at 100° C.) was added. A slight vacuum was applied at the top of the condenser. After fifteen minutes of vigorous refluxing a white solid began to deposit on the sides of the flask. After a total of one hour of heating, there was considerable solid on the walls of the flask and very little alcohol was thereafter evolved. When the contents started to darken, heating was discontinued, the flask was cooled to room temperature and 100 cc. of high boiling petroleum ether was added. The solid was broken up and then collected in a filter, washed twice with 50-cc. portions of high boiling petroleum ether, and finally dried in an oven at 55° C. The product weighed 39.5 g., corresponding to 97% of the theoretical.

(c) Hydrolysis

The ester from the preceding step was hydrolyzed with 10% aqueous sodium hydroxide and the acid liberated as in Example I. Hydrolysis required only five to ten minutes. The product weighed 29.1 g., corresponding to 83.7% of the theoretical; the unrecrystallized material melted at 249–51° C. (uncorr.).

(d) Decarboxylation

The acid from step (c) was decarboxylated in 650 cc. of diphenyl ether heated to reflux. A fluffy white solid formed during decarboxylation but this gradually went into solution. Heat was continued for a total period of about forty-five minutes or until no solid was present. The decarboxylated product weighed 22 g., corresponding to a yield of 96.1% of the theoretical.

(e) Conversion to 4-chloro-7-fluoroquinoline

This compound was prepared in the usual manner using phosphorus pentachloride and phosphorus oxychloride. Two runs gave yields corresponding to 62.7% and 70% of the theoretical.

After one recrystallization from ethyl alcohol, the product melted at 64 to 9° C. This particular product contained an appreciable proportion of the 5-fluoro isomer.

EXAMPLE IV

PREPARATION OF 4,7-DICHLORO-5-METHOXY-QUINOLINE

(a) Preparation of the anil

To prepare the anil, 41.3 g. (.262 mole) of 3-amino-5-chloroanisole was mixed with 55.1 g. (0.27 mole) of ethoxymethylenemalonic ester in a 250-cc. Erlenmeyer flask. This mixture was then heated in an oil bath at 110° C. for one hour to drive off the ethyl alcohol.

(b) Cyclization

Without isolation of the anil, the hot product of step (a) was poured into 500 cc. of refluxing diphenyl ether in a one-liter ground-joint flask equipped with a condenser. Refluxing was continued for one and one-half hours. After cooling the mixture, the solid ester was separated by filtration and washed with high boiling petroleum ether. When dried at 60° C. for four hours, the 3-carbethoxy-4-hydroxy-5-methoxy-7-chloroquinoline weighed 61.4 g. (0.218 mole), corresponding to an overall yield of 83% of the theoretical based on the amine; M. P. 260–5° C.

(c) Hydrolysis

For saponification of the ester, an alcohol-water solution of sodium hydroxide was used; this solution was prepared by dissolving 35 g. (0.87 mole) of solid sodium hydroxide in 325 cc. of water and adding 160 cc. of ethyl alcohol. To this solution in a one-liter round-bottomed flask fitted with a reflux condenser was added 61.4 g. (0.218 mole) of the crude ester. After heating the reaction mixture at the boiling point for ten to twelve hours, the solution was transferred without cooling to a 3-liter beaker and diluted with water to about 2200 cc. The basic solution was then neutralized by the slow addition of 10% aqueous hydrochloric acid, with vigorous stirring to break into small particles the flocculent precipitate formed and to avoid the formation of a gelatinous mass. The precipitate was collected on a Buchner funnel, and then washed by transferring it to a one liter beaker containing 500 cc. of water, stirring until a homogeneous suspension was obtained and then refiltering. The product was dried at 60° C. for twenty-four hours; the acid weighed 57.4 g. (0.227 mole), corresponding to a nearly quantitative yield; M. P. 255° C.

(d) Decarboxylation

The acid was decarboxylated by heating in diphenyl ether. Four hundred and twenty-five cubic centimeters of diphenyl ether in a 1-1 ground-joint, round-bottomed flask was heated to 175° C. and then 57.4 g. (0.227 mole) of 3-carboxy-4-hydroxy-5-methoxy-7-chloroquinoline was slowly added. Any water still present in the acid was driven off. The flask was then fitted with a reflux condenser and the temperature raised to the boiling point. After heating for three-quarters of an hour, nearly all the solid was dissolved. The hot solution was immediately filtered through a previously heated Buchner funnel. On cooling, the 4-hydroxy-5-methoxy-7-chloroquinoline separated. Approximately 100 cc. of high boiling petroleum ether was added to the cooled diphenyl ether, the precipitated solid removed by filtration, washed with high boiling petroleum ether and dried. There was obtained 39.6 g. (0.1895 mole) of the decarboxylated product corresponding to a yield of 83.5% of the theoreical. The melting point of the crude product was 240–50° C.

(e) Conversion to 4,7-dichloro-5-methoxyquinoline

In a 500-cc., three-necked, round-bottomed flask equipped with mechanical stirrer and reflux condenser was placed 42.5 g. (0.204 mole) of phosphorus pentachloride and 52.2 g. (0.34 mole) of phosphorus oxychloride. The flask was placed in a steam bath and heated to 90° C. Then, by as rapid addition as possible, 39.6 g. (0.190 mole) of the above crude hydroxyquinoline was introduced. After complete addition, the temperature was elevated to 130° C. and maintained there for thirty minutes. The excess phosphorus oxychloride was then removed by setting the reflux condenser for downward distillation and distilling until no more came over. The brown sticky product was dissolved by the addition of 100 cc. of cold water and the resulting brown solution was treated once with charcoal (Darco); cooled; and then neutralized with 10% aqueous sodium hydroxide. The crude product when filtered and dried weighed 32.2 g. (0.142 mole), a yield of 74.5%. The recrystallized product weighed 21.2 g. (0.090 mole) or 50% of the theoretical; M. P. 134° C.

EXAMPLE V

PREPARATION OF 4-HYDROXY-6-METHOXYQUINOLINE

(a) Formation of anil p-Anisidine was condensed with ethoxymethylenemalonic ester at 90–100° C., using the general procedure described in Example I for the preparation of the corresponding anil from m-chloraniline. Loss of alcohol proceeded readily. The resulting reaction mixture was used directly in the cyclization step.

(b) Cyclization

Cyclization was readily effected according to the general procedure described for the corresponding step in Example I. On several one-tenth mole runs, the amount of diphenyl ether used was varied within wide limits. Mineral oil (Stanolind) was also used as a solvent. The maximum yield (ca. 50%) was obtained from mineral oil.

(c) Hydrolysis and decarboxylation

Hydrolysis of the ethyl ester and decarboxylation of the acid take place under conditions similar to those described for the corresponding steps in Example I.

EXAMPLE VI

PREPARATION OF 4,7-DICHLORO-6-METHOXY-QUINOLINE

(a) Preparation of the anil

A solution of 2-chloro-4-aminoanisole and ethoxymethylenemalonic ester was heated at 100° C. for one and one-half hours. The rest of the preparation was similar to that described in step b of Example I. The anil crystallized readily when the reaction mixture was cooled.

(b) Cyclization

The anil, heated to a temperature of 100–120° C., was added to 3 to 4 times its weight of diphenyl ether maintained at 250° C. By vigorously refluxing the diphenyl ether solution, the reaction can be completed within thirty to forty-five minutes. The melting point of the product was 304–304.5° C. (uncorr., unrecryst.). The yield was about 82–100%.

(c) Hydrolysis

The usual procedure was employed using 10% aqueous sodium hydroxide. Hydrolysis was complete in two and one-half to three hours. The acid obtained by acidification becomes slimy when placed in water. The unrecrystallized product melted at 283–4° C. (with decarboxylation, unrecryst.). The yield was nearly quantitative.

(d) Decarboxylation to 4-hydroxy-6-methoxy-7-chloroquinoline

Decarboxylation was carried out by refluxing a diphenyl ether solution of the acid for three hours. Some decomposition into brown insoluble solid occurred, especially when large runs were carried out. Longer periods of heating also caused some decomposition into undesirable material. The product melted at 241–3° C. (recryst. once from alcohol and water). The yield in small scale runs averaged about 74% and in large scale runs, about 58.5%.

(e) Conversion to 4,7-dichloro-6-methoxyquinoline

The usual procedure was used. The final product did not dissolve completely when poured into ice water and concentrated aqueous hydrochloric acid was added to effect complete solution. The product crystallized nicely from ethyl alcohol; M. P., 162° C. (uncorr.). The yield was about 75–82% of the theoretical.

EXAMPLE VII

PREPARATION OF 4-HYDROXY-7-CHLOROQUINOLINE

(a) Preparation of ethoxymethylenecyanoacetic ester

This compound was prepared essentially according to the procedure of deBollment, Bull. Soc. Chim. (3) 25, 20 (1901). The ethyl acetate was removed by continuous distillation at 140–150° C., after which the acetic acid and excess acetic anhydride were removed at the water pump. The residue was recrystallized to give an average yield of 52 per cent for two runs. DeBollment obtained a yield of 47 per cent when the product was distilled.

(b) Preparation of the acrylate

The ethoxymethylenecyanoacetic ester was heated to 120–130° C. with an equivalent amount of m-chloroaniline for one hour. Ethyl alcohol distilled during the first half-hour. The ring closure was ordinarily carried out on the unpurified ethyl-2-cyano-3-(m-chloranilino)acrylate thus obtained, but an analytical sample was recrystallized from 95 per cent alcohol as white needles; M. P., 126.5 to 127.5° C.

(c) Cyclization

It was found that if the ring closure were carried out in diphenyl ether at the concentrations ordinarily used with the malonates (ca. 1 mole/liter) tarry reaction products resulted. However, with ten times this dilution (i. e., about 0.1 mole of acrylate/liter of diphenyl ether) the cyclized product began to separate from the boiling diphenyl ether after the mixture was refluxed for about two hours. A 60 per cent yield of product was obtained when the solution was refluxed four hours, and 70 per cent, after five hours. A run in which 0.2 mole of the acrylate (anil) was refluxed in 700 ml. of diphenyl ether for six hours gave a 36.5 per cent yield of cyclized product. This cyclized product, 3-cyano-4-hydroxy-7-chloroquinoline, crystallized from the diphenyl ether in tan flakes, M. P. ca. 360–370° C. An analytical sample may be prepared by sublimation.

(d) Hydrolysis

Thirteen and six-tenths grams of 3-cyano-4-hydroxy-7-chloroquinoline was refluxed with 200 g. of 60% sulfuric acid for one hour. After cooling the solution, the tan crystals which separated were removed by filtration through a sintered-glass funnel. The solid was dissolved in dilute alkali, treated with charcoal, and reprecipitated with acid to give white 4-hydroxy-7-chloroquinoline-3-carboxylic acid, M. P. 270–2° C. (with decarboxylation); yield 12.7 g. The filtrate, made alkaline, treated with charcoal, and then neutralized, yielded 1.7 g. of a solid melting below 240° C. (with decarboxylation).

(e) Decarboxylation

The acid melting at 270–2° C. (dec.), was decarboxylated by fusion at 275–285° C. One recrystallization from ethyl alcohol-water yielded 4 g. of 4-hydroxy-7-chloroquinoline, M. P. 274–280° C. Concentration of the filtrate yielded an additional 3.3 g., M. P. 276–280° C. The mixed melting point with an authentic sample of 4-hydroxy-7-chloroquinoline was 276–279° C.

Decarboxylation and subsequent recrystallization of the product melting below 240° C. (dec.) yielded a small amount of material, M. P. 235–240° C.

The yield of pure 4-hydroxy-7-chloroquinoline was 7.3 g. or 70% of the theoretical, based on the nitrile. Concentration of the filtrates and recrystallization of the low-melting products which were obtained may increase the yield.

EXAMPLE VIII

PREPARATION OF 4-HYDROXY-7-CHLOROQUINOLINE USING FORMAMIDINE AS AN INTERMEDIATE

(a) Preparation of N,N'-di-(m-chlorophenyl) formamidine

Four-tenths of a mole of m-chloroaniline and 0.2 mole of ethyl orthoformate were heated under reflux for three hours. The ethyl alcohol was then distilled leaving a residue which gave a 92.6 per cent yield of the amidine after one recrystallization; M. P. 116–117° C.

(b) Preparation of the acrylate

Equivalent amounts of N,N'-di-m-chlorophenylformamidine and malonic ester were heated to 150–165° C. for two hours. The 1-carbethoxy-2-(m-chloranilino)-acrylo-m-chloranilide was obtained as fine white needles in 70 per cent yield after one recrystallization; M. P., 113–114° C.

(c) Cyclization

When the ring closure of the acrylate was carried out with the concentrations generally used for ring closure of the malonates, tarry reaction products resulted. However, with ten times the dilution (i. e., using about 0.1 mole of acrylate to 1 liter of diphenyl ether) and three hours of refluxing, light brown plates crystallized on cooling. The m-chloranilide of 4-hydroxy- 7-chloroquinoline-3-carboxylic acid thus obtained melted at 320–322° C. after recrystallization. The yield was 58% of the theoretical. When cyclization was carried out at twice this dilution, the yield was 75%.

(d) Hydrolysis

The anilide was hydrolyzed to 4-hydroxy-7-chloroquinoline-3-carboxylic acid by refluxing the former for five minutes in 75% sulfuric acid.

(e) Decarboxylation

The acid was decarboxylated to 4-hydroxy-7-chloroquinoline by fusion at 260–270° C. The fused mass, recrystallized from glacial acetic acid, gave 4-hydroxy-7-chloroquinoline as large, white prisms, M. P. 282.5–286° C. The melting point mixed with an authentic sample (M. P. 280.5–282° C.) was 282.5–286° C.

It will be apparent to those skilled in the art that many variations and modifications may be made in the detailed procedures described in the foregoing specific examples. It will also be apparent that the basic principles of the present invention may be applied to the preparation of many compounds other than those herein specifically characterized. Thus for example, the following interesting types of compounds may be prepared from the starting materials indicated:

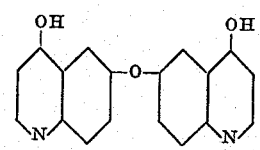

from

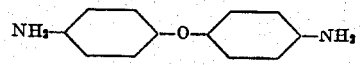

from

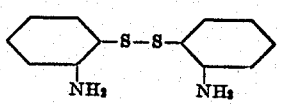

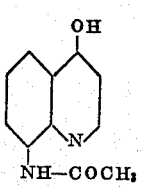

from

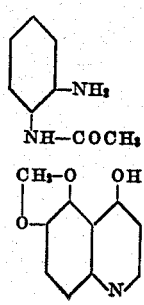

from

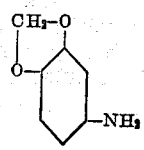

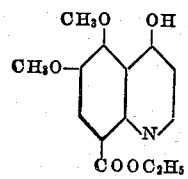

from

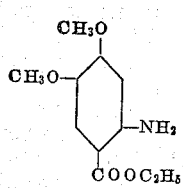

Many other applications of the principles of the present invention will be readily apparent to those skilled in the art. All such variations, modifications and extensions of the principles of present inventions are to be understood as embraced within the scope of the appended claims. In connection with this application, reference may be made to the copending applications of Harold R. Snyder and Robert E. Jones, Ser. Nos. 597,586 and 597,587, now Patent No. 2,504,896, both filed June 4, 1945.

Having thus described our invention, what we claim as new and wish to secure by Letters Patent is:

1. In the preparation of nuclear substituted 4-hydroxyquinoline compounds, the improvement which comprises heating to a temperature sufficient to effect ring-closure, a compound selected from the group consisting of the substituted acrylates and the corresponding isomeric anils having the general formulae

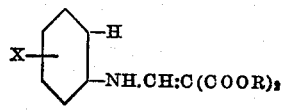

and

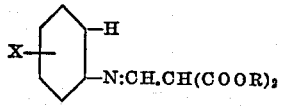

where X is at least one halo radical and R is an alkyl radical, by heating a solution of the said compound in a high-boiling, inert solvent consisting principally of diphenyl ether, converting the resulting cyclized product by hydrolysis to the corresponding substituted 4-hydroxyquinoline-3-carboxylic acid, and then heating the said acid to a temperature sufficient to decarboxylate the same, to produce a compound having the general formula

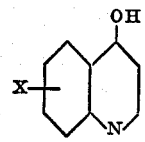

where X is at least one halo radical.

2. In the preparation of nuclear substituted 4-hydroxyquinoline compounds, the improvement which comprises heating to a temperature sufficient to effect ring-closure, a compound selected from the group consisting of the substituted acrylates and the corresponding isomeric anils having the general formulae

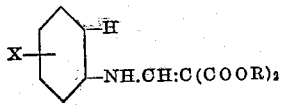

and

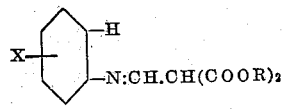

where X is at least one halo radical and R is an alkyl radical, effecting the said ring-closure by maintaining a diphenyl ether solution of the said compound containing on the order of one mole of compound per liter of diphenyl ether, at a temperature of the order of the boiling point of the said solvent until distillation of the alcohol produced in the cyclization reaction substantially ceases, converting the resulting cyclized product by hydrolysis to the corresponding substituted 4-hydroxyquinoline-3-carboxylic acid, and then heating the said acid to a temperature sufficient to decarboxylate the same, to produce a compound having the general formula

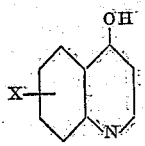

where X is at least one halo radical.

CHARLES C. PRICE.
ROYSTON M. ROBERTS.
HARRY F. HERBRANDSON.

REFERENCES CITED

The following references are of record in the file of this patent:

UNITED STATES PATENTS

| Number | Name | Date |
|---|---|---|
| 2,304,820 | Hanford et al. | Dec. 15, 1942 |
| 2,351,391 | Bergstrom et al. | June 13, 1944 |

FOREIGN PATENTS

| Number | Country | Date |
|---|---|---|
| 42,276 | Germany | Jan. 19, 1888 |

OTHER REFERENCES

Just, Berichte, vol. 18, pp. 2632–2635 (1885).
Just, Berichte, vol. 19, pp. 1462–1466 and 1541–1545 (1886).
Claisen, Annalen, vol. 297, pp. 75–78 (1897).
Rubtsov, J. Gen. Chem. (U. S. S. R.), vol. 7 (1937), pp. 1885–1895.
Fuson and Shriner, Identification of Organic Compounds (John Wiley & Sons, New York, 1940), 2nd edition, pp. 139, 140, 188, 189.